US009888260B2

(12) United States Patent
Kosaka

(10) Patent No.: US 9,888,260 B2
(45) Date of Patent: Feb. 6, 2018

(54) INFORMATION PROCESSING DEVICE, INFORMATION PROCESSING METHOD, AND PROGRAM

(71) Applicant: Sony Corporation, Tokyo (JP)

(72) Inventor: Yoshihiro Kosaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 194 days.

(21) Appl. No.: 14/413,762

(22) PCT Filed: Jul. 16, 2013

(86) PCT No.: PCT/JP2013/004328
§ 371 (c)(1),
(2) Date: Jan. 9, 2015

(87) PCT Pub. No.: WO2014/017047
PCT Pub. Date: Jan. 30, 2014

(65) Prior Publication Data
US 2015/0163521 A1 Jun. 11, 2015

(30) Foreign Application Priority Data

Jul. 26, 2012 (JP) ................. 2012-165605

(51) Int. Cl.
*H04N 19/895* (2014.01)
*H04N 19/597* (2014.01)
(Continued)

(52) U.S. Cl.
CPC ....... *H04N 19/895* (2014.11); *H04N 13/0048* (2013.01); *H04N 13/0059* (2013.01);
(Continued)

(58) Field of Classification Search
CPC ...... H04N 19/67; H04N 19/51; H04N 19/895; H04N 13/0059; H04N 13/0048;
(Continued)

(56) References Cited

U.S. PATENT DOCUMENTS 5,633,682 A * 5/1997 Tahara ............... H04N 13/0003
348/42
5,963,664 A * 10/1999 Kumar ..................... G06K 9/32
348/47

(Continued)

FOREIGN PATENT DOCUMENTS

JP 2012-010066 A 1/2012
WO WO 02/071640 A1 9/2002

OTHER PUBLICATIONS

A. Serdar Tan et al., (hereinafter Tan) "Error Resilient Layered Stereoscopic Video Streaming".*

(Continued)

*Primary Examiner* — Dramos I Kalapodas
(74) *Attorney, Agent, or Firm* — Wolf, Greenfield & Sacks, P.C.

(57) ABSTRACT

A system comprising at least one processor configured to perform: accessing parallax information for a first portion of a first image, the parallax information calculated based on a second image associated with the first image; accessing motion information for the first portion of the first image, the motion information calculated based on a third image captured at a different time than the first image; and generating error correction information for the first portion of the first image based on the parallax information and the motion information.

21 Claims, 9 Drawing Sheets

(51) Int. Cl.
*H04N 19/67* (2014.01)
*H04N 13/00* (2006.01)
*H04N 19/51* (2014.01)

(52) U.S. Cl.
CPC ........... *H04N 19/597* (2014.11); *H04N 19/67* (2014.11); *H04N 19/51* (2014.11)

(58) Field of Classification Search
CPC .... H04N 19/597; H04N 19/577; H04N 19/70; H04N 19/52; H04N 19/61; H04N 19/154; H04N 19/13; H04N 19/12; H04N 19/615; H04N 19/172; H04N 19/63; H04N 19/635; H04N 13/0282; H04N 13/0007; H04N 13/0066; H04N 13/0022; H04N 13/0055; H04N 2213/003; H04N 13/0454; H04N 13/0011; H04N 13/0037; H04N 13/025; H04N 2013/0081; H04N 13/0246; H04N 13/0242; H04N 13/0239; H04N 13/0296; H04N 13/0285; H04N 19/44; G06T 7/55; G06T 2207/10012; G06T 5/50

See application file for complete search history.

(56) References Cited

U.S. PATENT DOCUMENTS

| | | | | |
|---|---|---|---|---|
| 6,269,175 | B1* | 7/2001 | Hanna | G06T 5/50 |
| | | | | 348/E13.014 |
| 2003/0140347 | A1* | 7/2003 | Varsa | H04N 21/236 |
| | | | | 725/90 |
| 2006/0262856 | A1* | 11/2006 | Wu | H04N 19/597 |
| | | | | 375/240.19 |
| 2007/0253482 | A1* | 11/2007 | Kazui | H04N 19/597 |
| | | | | 375/240.12 |
| 2008/0303893 | A1* | 12/2008 | Kim | H04N 13/0022 |
| | | | | 348/42 |
| 2010/0008422 | A1* | 1/2010 | Shimizu | H04N 19/597 |
| | | | | 375/240.16 |
| 2011/0141235 | A1* | 6/2011 | Tsukagoshi | H04N 13/007 |
| | | | | 348/43 |
| 2011/0234760 | A1* | 9/2011 | Yang | H04N 13/0048 |
| | | | | 348/46 |
| 2011/0254920 | A1* | 10/2011 | Yun | H04N 13/0048 |
| | | | | 348/43 |
| 2012/0069902 | A1* | 3/2012 | Yamori | H04N 19/597 |
| | | | | 375/240.12 |
| 2012/0162386 | A1* | 6/2012 | Kim | H04N 13/0018 |
| | | | | 348/47 |
| 2013/0121602 | A1* | 5/2013 | Azukizawa | G06T 9/001 |
| | | | | 382/233 |
| 2013/0147915 | A1* | 6/2013 | Wiegand | H04N 13/0048 |
| | | | | 348/43 |
| 2013/0222534 | A1* | 8/2013 | Rusanovskyy | H04N 13/0011 |
| | | | | 348/43 |
| 2015/0049814 | A1* | 2/2015 | Sung | H04N 19/597 |
| | | | | 375/240.16 |
| 2016/0188181 | A1* | 6/2016 | Smith | G06F 3/048 |
| | | | | 715/765 |

OTHER PUBLICATIONS

P. Y. Yip et al., (hereinafter Yip) "Joint Source and Channel Coding for H.264 Compliant Stereoscopic Video Transmission"; May 2005 © IEEE 0-7803-8886-0.*

Serdar Tan et al., "Error Resilient Layered Stereoscopic Video Streaming", 3DTV Conference, 2007, IEEE, PI, May 1, 2007, pp. 1-4.

Yip et al., "Joint source and channel coding for h.264 compliant stereoscopic video transmission", Electrical and Computer Engineering, 2005, Canadian Conference on Saskatoon, SK, Canada, May 1-4, Piscataway, NJ, USA, IEEE, May 1, 2005, pp. 188-191.

* cited by examiner

[Fig. 1]
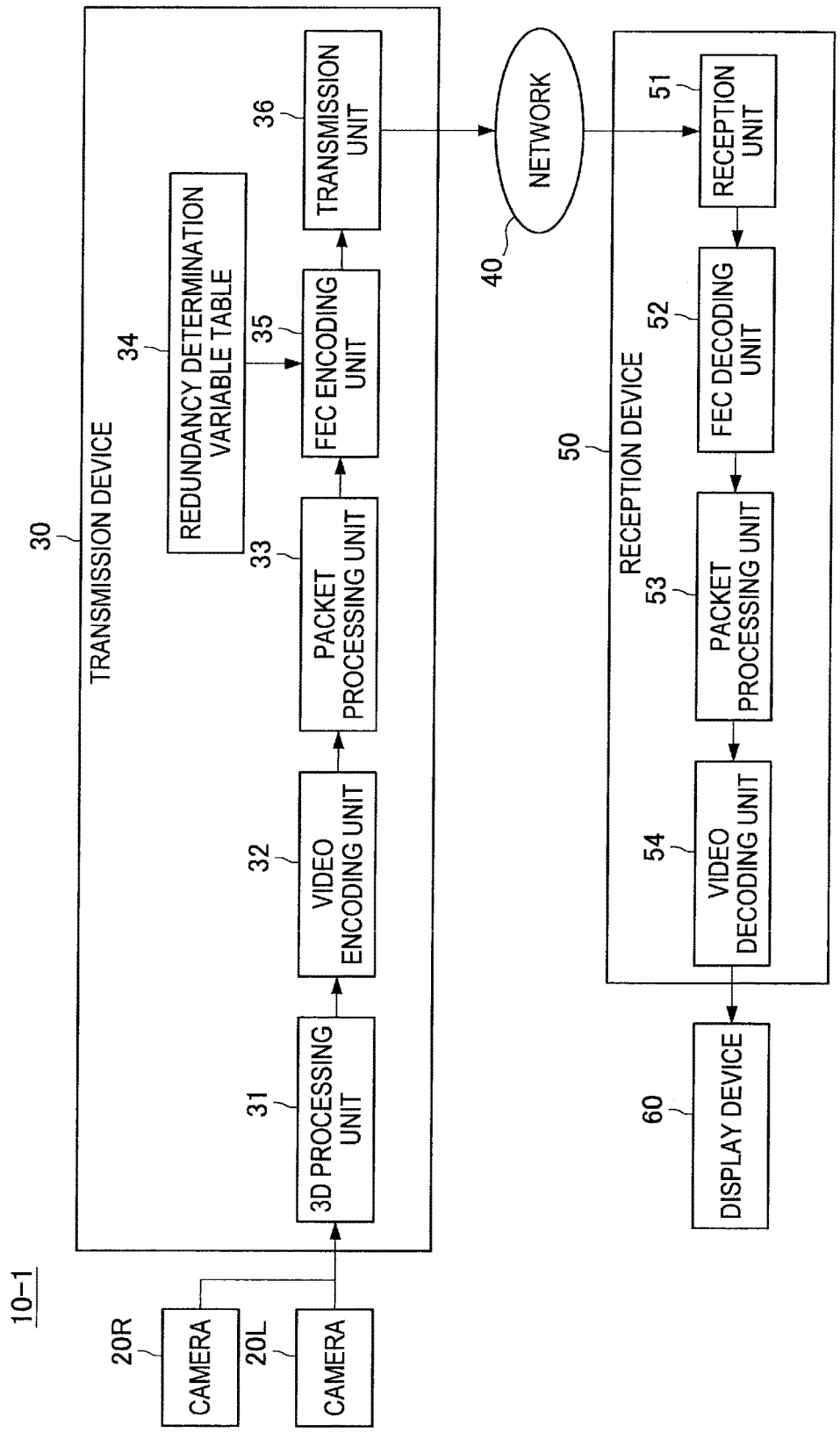

[Fig. 2]

| | |
|---|---|
| MOTION VECTOR COMPONENT WEIGHTING CONSTANT | a |
| PARALLAX VECTOR COMPONENT WEIGHTING CONSTANT | b |
| MOTION PARALLAX VECTOR WEIGHTING CONSTANT | a1 |
| PACKET REDUNDANCY NORMALIZING CONSTANT | X |

[Fig. 3]
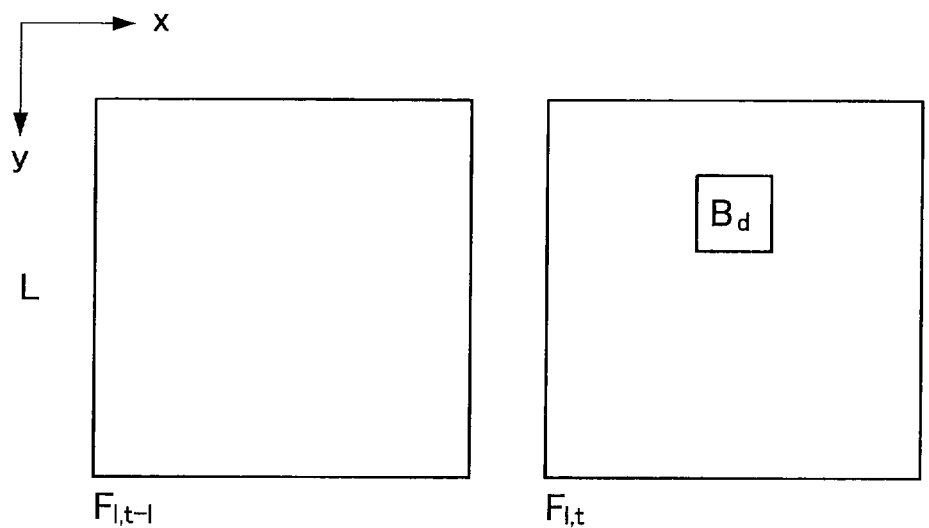
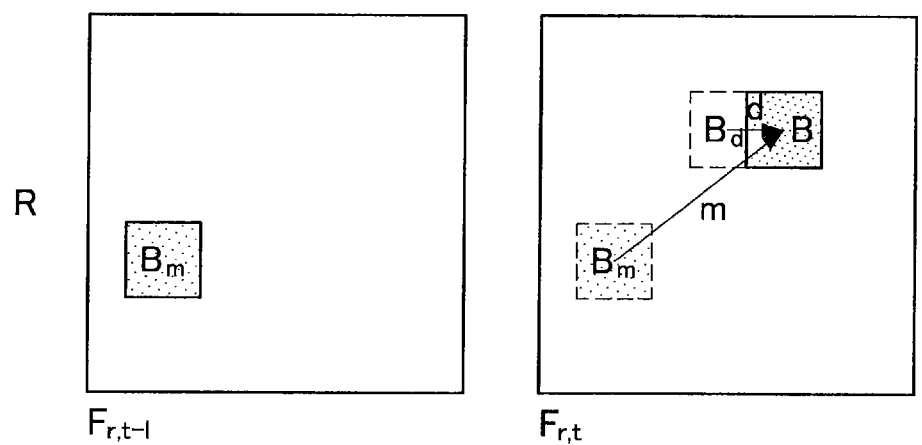

[Fig. 4]
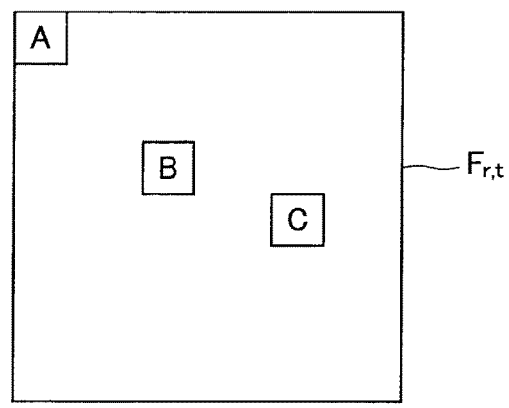
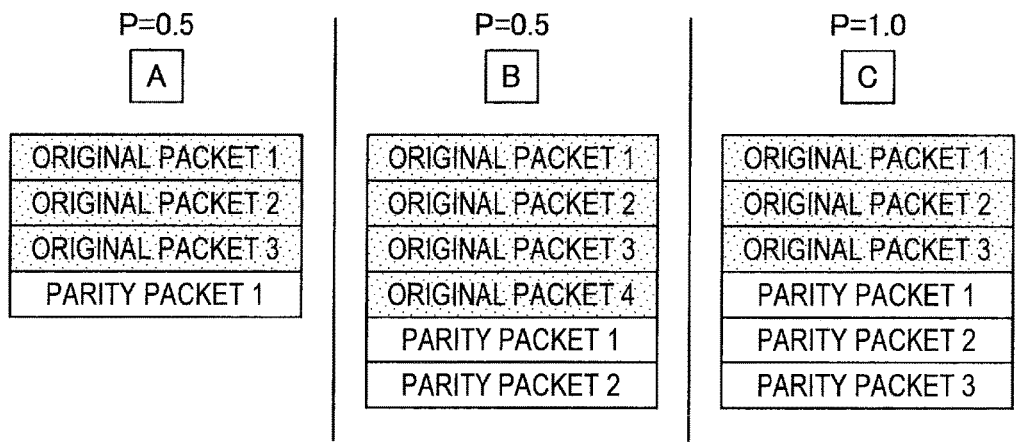

[Fig. 5]
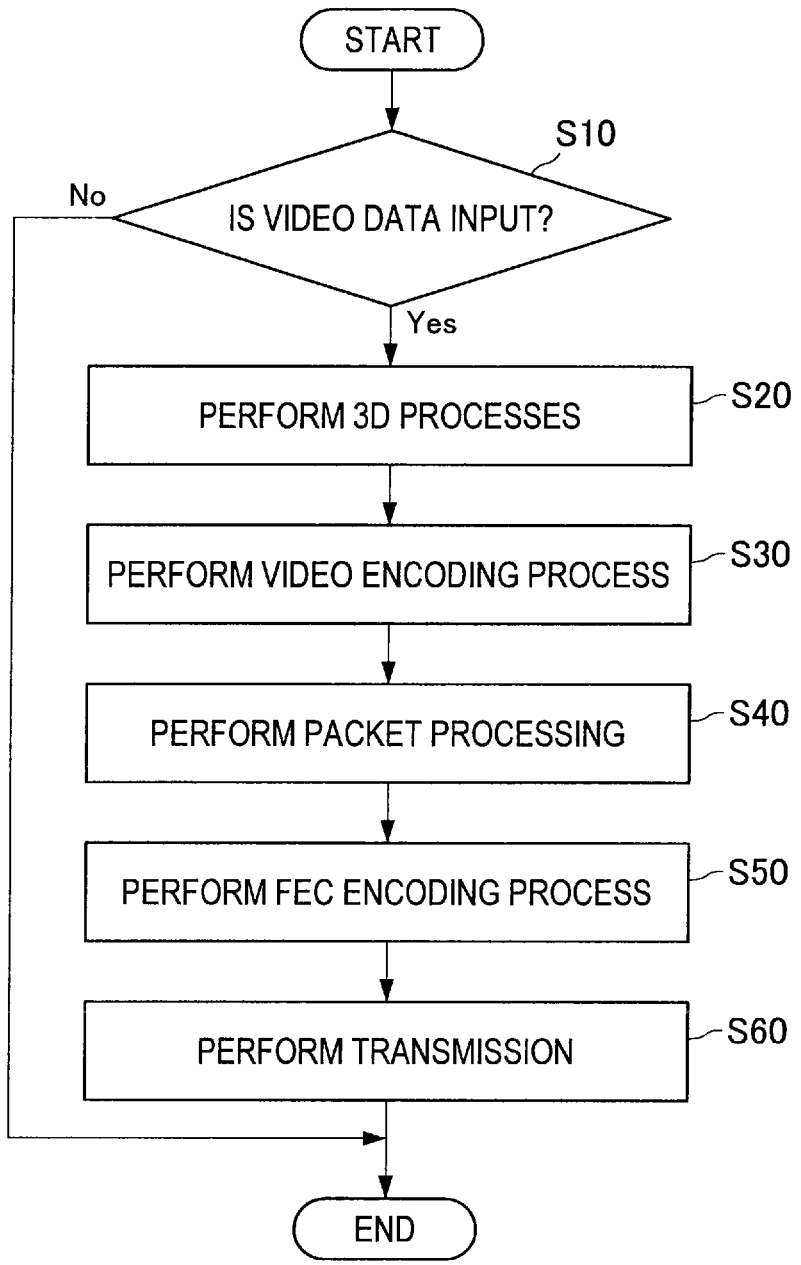

[Fig. 6]
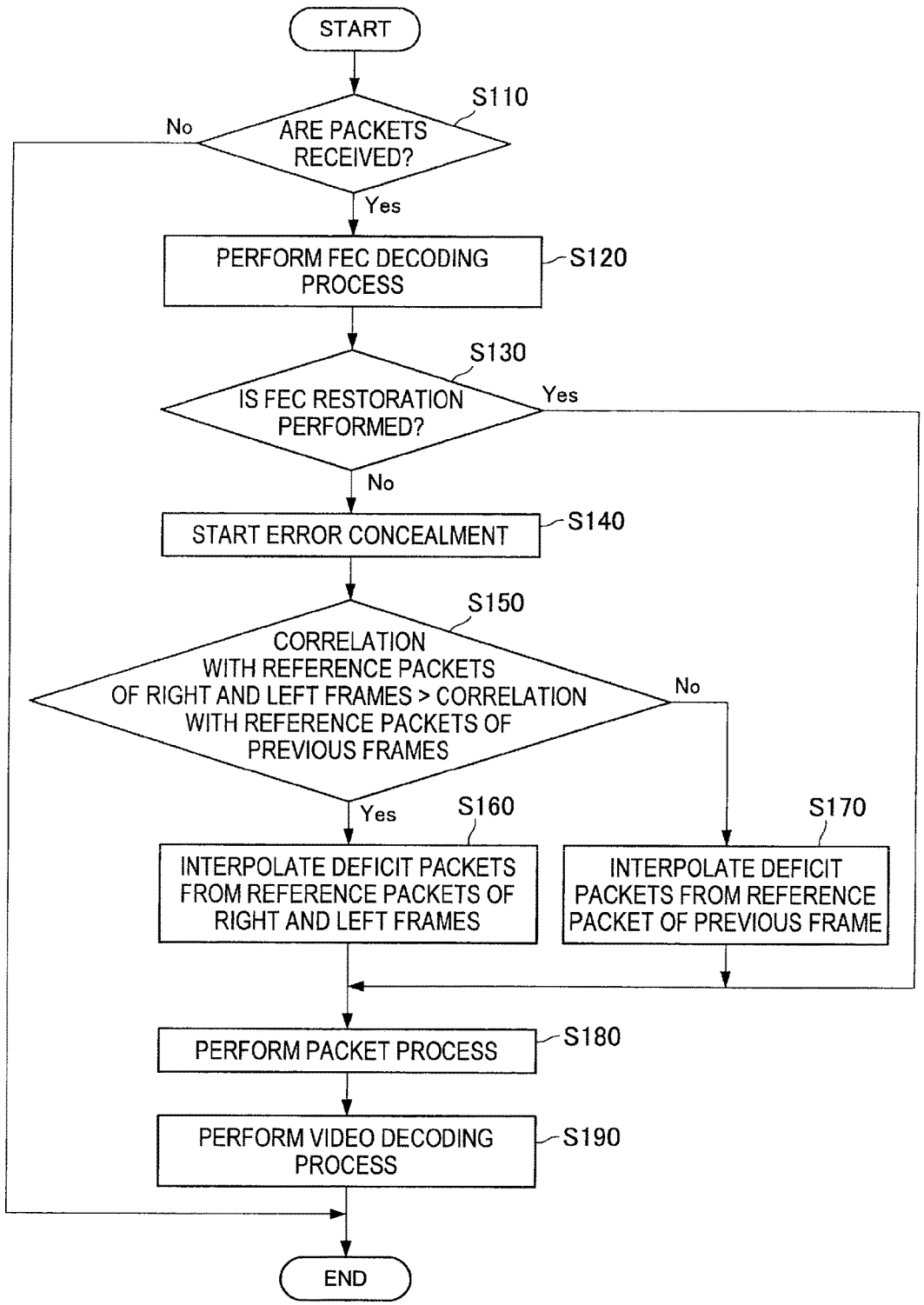

[Fig. 7]
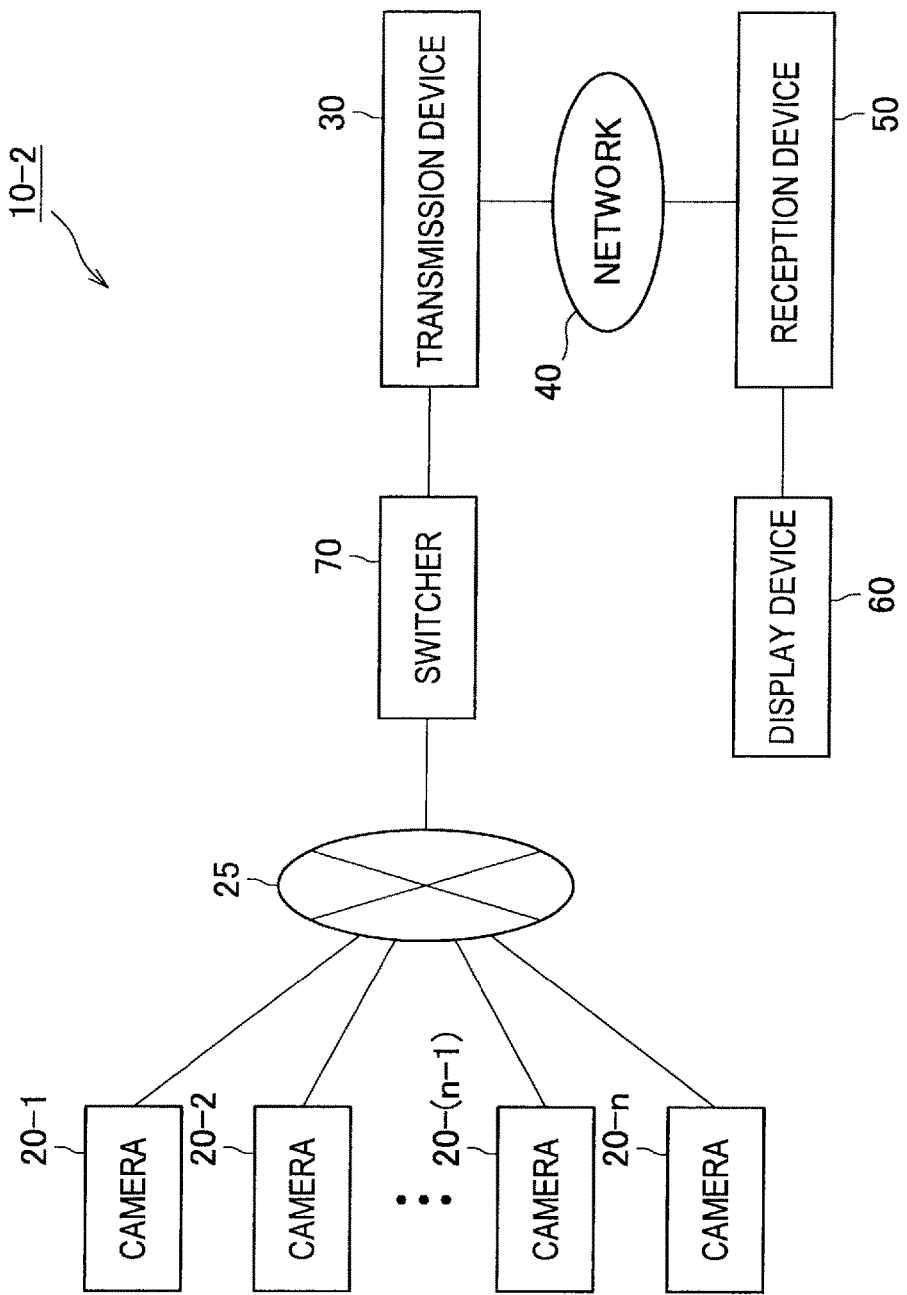

[Fig. 8]

| 3D TARGET CAMERA VIDEO ID PAIR | (Rid, Lid) |
|---|---|
| MOTION VECTOR COMPONENT WEIGHTING CONSTANT | a |
| PARALLAX VECTOR COMPONENT WEIGHTING CONSTANT | b |
| MOTION PARALLAX VECTOR WEIGHTING CONSTANT | a1 |
| PACKET REDUNDANCY NORMALIZING CONSTANT | X |

[Fig. 9]
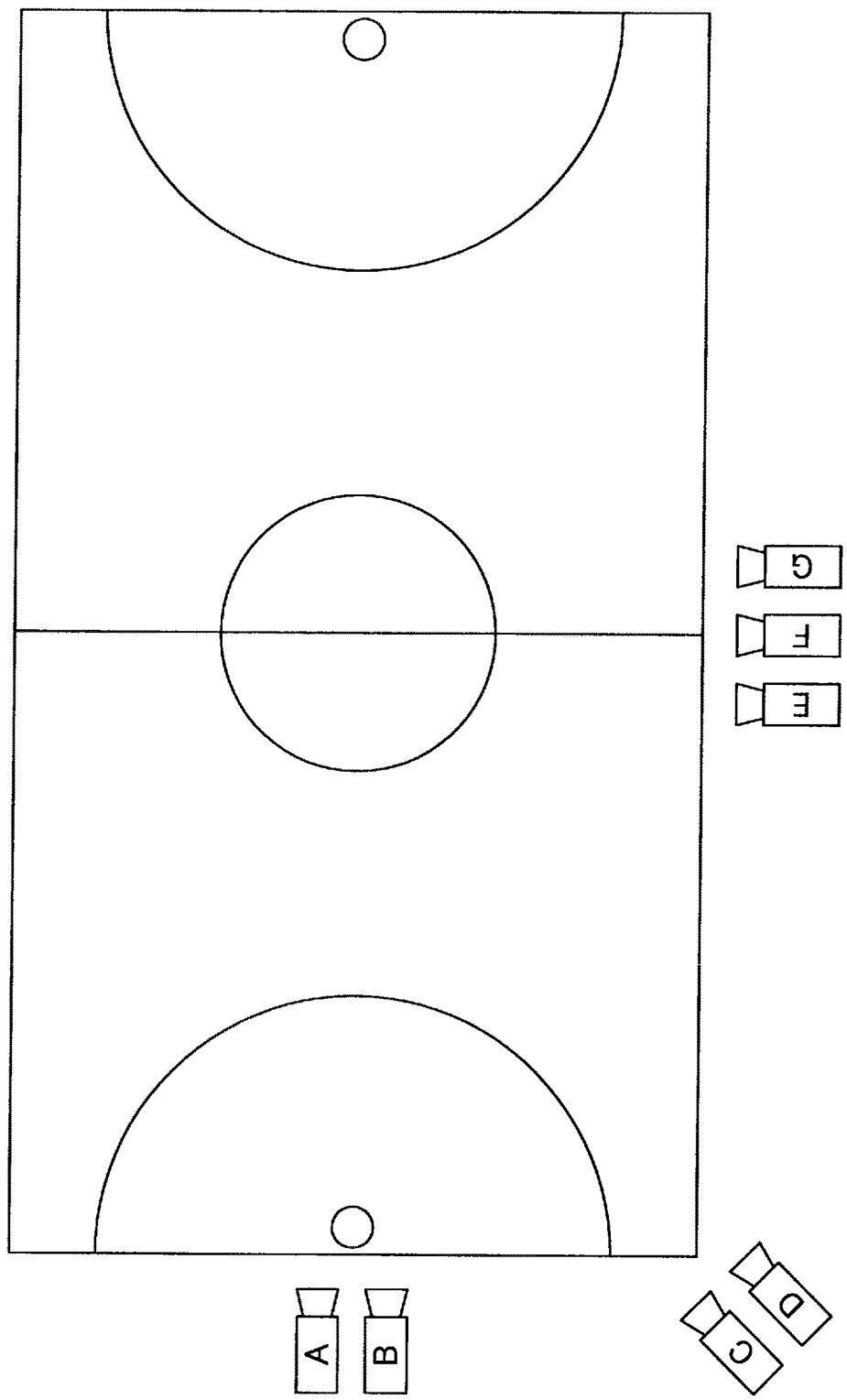

INFORMATION PROCESSING DEVICE, INFORMATION PROCESSING METHOD, AND PROGRAM

TECHNICAL FIELD

The present disclosure relates an information processing device, an information processing method, and a program.

The present disclosure contains subject matter related to that disclosed in U.S. National Stage Application under 35 U.S.C. § 371, based on International Application No. PCT/JP2013/004328, filed Jul. 16, 2013, which claims priority to Japanese Priority Patent Application JP 2012-165605 filed in the Japan Patent Office on Jul. 26, 2012, the entire content of which is hereby incorporated by reference.

BACKGROUND ART

According to a technology disclosed in PTL 1, an error correction code (ECC) is assigned to right-eye and left-eye images based on parallax information of the right-eye and left-eye images.

CITATION LIST

Patent Literature

[PTL 1] JP 2012-10066A

SUMMARY

Technical Problem

In the technology disclosed in PTL 1, however, when the error correction code (ECC) is generated, motion information of the right-eye and left-eye images is not considered. Therefore, the quality of the right-eye and left-eye images may deteriorate in network transmission. Accordingly, it is necessary to provide a technology capable of suppressing quality deterioration in the network transmission of the right-eye and left eye images.

Solution to Problem

Some embodiments provide for a system comprising at least one processor configured to perform: accessing parallax information for a first portion of a first image, the parallax information calculated based on a second image associated with the first image; accessing motion information for the first portion of the first image, the motion information calculated based on a third image captured at a different time than the first image; and generating error correction information for the first portion of the first image based on the parallax information and the motion information.

Some embodiments provide for a system comprising a first system, comprising at least one processor configured to perform: accessing parallax information for a first portion of a first image, the parallax information calculated based on a second image associated with the first image; accessing motion information for the first portion of the first image, the motion information calculated based on a third image captured at a different time than the first image; and generating error correction information for the first portion of the first image based on the parallax information and the motion information; encoding the first portion of the first image based at least in part on the error correction information to obtain a first encoded portion; and transmitting the first encoded portion and the error correction information to a second system; and the second system, configured to perform acts of: receiving the first encoded portion and the generated error correction information from the first system; and decoding the first encoded portion to obtain a first decoded portion.

Some embodiments provide for a method comprising: accessing parallax information for a first portion of a first image, the parallax information calculated based on a second image associated with the first image; accessing motion information for the first portion of the first image, the motion information calculated based on a third image captured at a different time than the first image; and generating error correction information for the first portion of the first image based on the parallax information and the motion information.

Some embodiments provide for a memory storing a program that, when executed by at least one processor, causes the at least one processor to perform: accessing parallax information for a first portion of a first image, the parallax information calculated based on a second image associated with the first image; accessing motion information for the first portion of the first image, the motion information calculated based on a third image captured at a different time than the first image; and generating error correction information for the first portion of the first image based on the parallax information and the motion information.

Some embodiments provide for a system comprising at least one processor configured to perform: accessing parallax information for a first portion of a first image, the parallax information calculated based on a second image associated with the first image; accessing motion information for the first portion of the first image, the motion information calculated based on a third image captured at different time than the first image; and executing error concealment processing for the first portion of the first image based on the parallax information and the motion information.

Some embodiments provide for a method comprising: accessing parallax information for a first portion of a first image, the parallax information calculated based on a second image associated with the first image; accessing motion information for the first portion of the first image, the motion information calculated based on a third image captured at a different time from the first image; and executing error concealment processing for the first portion of the first image based on the parallax information and the motion information.

Some embodiments provide for a memory storing a program that, when executed by at least one processor, causes the at least one processor to perform: accessing parallax information for a first portion of a first image, the parallax information calculated based on a second image associated with the first image; accessing motion information for the first portion of the first image, the motion information calculated based on a third image captured at a different time from the first image; and executing error concealment processing for the first portion of the first image based on the parallax information and the motion information.

According to an embodiment of the present disclosure, there is provided an information processing device including an encoding unit that extracts a criterion block from one image of right-eye and left-eye images, extracts a parallax reference block corresponding to the criterion block from the other image, and generates parallax information indicating a distance between a display position of the parallax reference block and a display position of the criterion block, extracts a motion reference block corresponding to the criterion block from the one image of a previous frame and generates motion information indicating a distance between a display position of the motion reference block and the display position of the criterion block, and generates error correction code (ECC) information to be assigned to the criterion block based on the parallax information and the motion information.

According to an embodiment of the present disclosure, there is provided an information processing device including a reception unit that receives error correction code (ECC) information from another information processing device that extracts a criterion block from one image of right-eye and left-eye images, extracts a parallax reference block corresponding to the criterion block from the other image, generates parallax information indicating a distance between a display position of the parallax reference block and a display position of the criterion block, extracts a motion reference block corresponding to the criterion block from the one image of a previous frame, generates motion information indicating a distance between a display position of the motion reference block and the display position of the criterion block, and generates the error correction code (ECC) information to be assigned to the criterion block based on the parallax information and the motion information, and a decoding unit that performs an error concealment process on the criterion block based on the parallax reference block and the motion reference block, when restoration of the criterion block based on the error correction code (ECC) information is not performed.

According to an embodiment of the present disclosure, there is provided an information processing method including extracting a criterion block from one image of right-eye and left-eye images, extracting a parallax reference block corresponding to the criterion block from the other image, and generating parallax information indicating a distance between a display position of the parallax reference block and a display position of the criterion block, extracting a motion reference block corresponding to the criterion block from the one image of a previous frame and generating motion information indicating a distance between a display position of the motion reference block and the display position of the criterion block, and generating error correction code (ECC) information to be assigned to the criterion block based on the parallax information and the motion information.

According to an embodiment of the present disclosure, there is provided an information processing method including receiving error correction code (ECC) information from another information processing device that extracts a criterion block from one image of right-eye and left-eye images, extracts a parallax reference block corresponding to the criterion block from the other image, generates parallax information indicating a distance between a display position of the parallax reference block and a display position of the criterion block, extracts a motion reference block corresponding to the criterion block from the one image of a previous frame, generates motion information indicating a distance between a display position of the motion reference block and the display position of the criterion block, and generates the error correction code (ECC) information to be assigned to the criterion block based on the parallax information and the motion information, and performing an error concealment process on the criterion block based on the parallax reference block and the motion reference block when restoration of the criterion block based on the error correction code (ECC) information is not performed.

According to an embodiment of the present disclosure, there is provided a program causing a computer to realize an encoding function of extracting a criterion block from one image of right-eye and left-eye images, extracting a parallax reference block corresponding to the criterion block from the other image, and generating parallax information indicating a distance between a display position of the parallax reference block and a display position of the criterion block, extracting a motion reference block corresponding to the criterion block from the one image of a previous frame and generating motion information indicating a distance between a display position of the motion reference block and the display position of the criterion block, and generating error correction code (ECC) information to be assigned to the criterion block based on the parallax information and the motion information.

According to an embodiment of the present disclosure, there is provided a program causing a computer to realize a reception function of receiving error correction code (ECC) information from another information processing device that extracts a criterion block from one image of right-eye and left-eye images, extracts a parallax reference block corresponding to the criterion block from the other image, generates parallax information indicating a distance between a display position of the parallax reference block and a display position of the criterion block, extracts a motion reference block corresponding to the criterion block from the one image of a previous frame, generates motion information indicating a distance between a display position of the motion reference block and the display position of the criterion block, and generates the error correction code (ECC) information to be assigned to the criterion block based on the parallax information and the motion information, and decoding function of performing an error concealment process on the criterion block based on the parallax reference block and the motion reference block when restoration of the criterion block based on the error correction code (ECC) information is not performed.

According to the embodiments of the present disclosure, the error correction code (ECC) information assigned to the criterion block is generated based on the parallax information and the motion information. Thus, according to the technology according to the present disclosure, it is possible to assign the error correction code (ECC) information according to a motion of the criterion block.

Advantageous Effects of Invention

According to the embodiments of the disclosure described above, it is possible to suppress the equality deterioration in the network transmission of the right-eye and left-eye images.

BRIEF DESCRIPTION OF DRAWINGS

FIG. 1 is a block diagram illustrating the configuration of an information processing system according to a first embodiment of the present disclosure.

FIG. 2 is an explanatory diagram illustrating the structure of a redundancy determination variable table according to the embodiment.

FIG. 3 is an explanatory diagram illustrating examples of a parallax vector (parallax information) and a motion vector (motion information).

FIG. 4 is an explanatory diagram illustrating a correlation between redundancy and the number of parity packets.

FIG. 5 is a flowchart illustrating a processing order by a transmission device (information processing device).

FIG. 6 is a flowchart illustrating a processing order by a reception device (information processing device).

FIG. 7 is a block diagram illustrating the configuration of an information processing system according to a second embodiment of the present disclosure.

FIG. 8 is an explanatory diagram illustrating the structure of a redundancy determination variable table according to the second embodiment.

FIG. 9 is an explanatory diagram illustrating an embodiment of the present disclosure.

DESCRIPTION OF EMBODIMENTS

Hereinafter, preferred embodiments of the present disclosure will be described in detail with reference to the appended drawings. Through the specification and the drawings, the same reference numerals are given to constituent elements having substantially the same functional configurations and the repeated description thereof will be omitted.

The description will be made in the following order.
1. First embodiment (example in which two cameras are connected to transmission device)
 1-1. Entire configuration of information processing system
 1-2. Configurations of camera and transmission device
 1-3. Configuration of reception device
 1-4. Processing order by transmission device
 1-5. Processing order by reception device
2. Second embodiment (example in which plurality of cameras are connected to transmission device via network)
3. Embodiment
<1. First Embodiment>
(1-1. Entire Configuration of Information Processing System)

First, the entire configuration of an information processing system 10-1 according to a first embodiment of the present disclosure will be described with reference to FIG. 1. The information processing system 10-1 includes cameras 20L and 20R, a transmission device 30, a network 40, a reception device 50, and a display device 60. The network 40 connects the transmission device 30 to the reception device 50.

The camera 20L captures a left-eye image (video) and transmits the left-eye image to the transmission device 30. The left-eye image is an image that is perceived by the left eye of a user. The camera 20R captures a right-eye image (video) and transmits the right-eye image to the transmission device 30. The right-eye image is an image that is perceived by the right eye of the user. As illustrated in FIG. 3, an xy plane is set in the right-eye and left-eye images (hereinafter, also collectively referred to as "stereo images"). The horizontal direction is the x axis and the vertical direction is the y axis. Accordingly, the positions of respective pixels constituting right-eye and left-eye images are indicated by xy coordinates.

The transmission device 30 performs an FEC (Forward Error Correction) encoding process to be described below on the right-eye and left-eye images. That is, the transmission device 30 extracts a criterion block from one image of the right-eye and left-eye images and extracts a parallax reference block corresponding to the criterion block from the other image. Then, the transmission device 30 generates a parallax vector (parallax information) indicating a distance (parallax) between a display position of the parallax reference block and a display position of the criterion block. That is, the parallax vector is information that indicates parallax between the right-eye and left-eye images.

The transmission device 30 extracts a motion reference block corresponding to the criterion block from one image of a previous frame (for example, a frame one frame ahead of the current frame) and generates a motion vector (motion information) indicating a distance between a display position of the motion reference block and the display position of the criterion block. That is, the motion vector is information that indicates a motion amount by which the criterion block moves per unit time in the right-eye image (or the left-eye image).

Then, the transmission device 30 determines redundancy of a parity packet (error correction code (ECC) information) based on the parallax information, the motion information, and camera characteristics. Here, the camera characteristics are information that indicates installation environments, usages, or the like of the cameras 20L and 20R. The cameras 20L and 20R capture an image with a large motion or an image with large parallax according to the characteristics. Thus, the transmission device 30 determines a weight amount (priority) of the parallax information and the motion information based on the camera characteristics. That is, for example, when the camera 20L captures a left-eye image with a large motion, the transmission device 30 enlarges a weight to the motion information. Then, the transmission device 30 determines redundancy based on the parallax information and the motion information subjected to the weighting. That is, the transmission device 30 sets the redundancy of the parity packet to a larger value when parallax of the criterion block is larger or the motion is larger. Then, the transmission device 30 generates a parity packet based on the redundancy. The transmission device 30 assigns the parity packet to both of the right-eye and left-eye images.

The transmission device 30 transmits, to the reception device 50, the stereo images to which the parity packet is assigned. The reception device 50 restores the right-eye and left-eye images based on the parity packets and displays the right-eye and left-eye images on the display device 60. When the restoration based on the parity packets is not achieved, the reception device 50 performs error concealment on the criterion block based on the parallax reference block and the motion reference block. Thus, the reception device 50 restores the stereo images.

Thus, the information processing system 10-1 transmits the stereo images captured by the cameras 20L and 20R to the reception device 50 via the network 40. Accordingly, network delay or packet loss may occur. When the cameras 20L and 20R are so-called live cameras (cameras showing captured images on the display device 60 in real time), the stereo images displayed by the display device 60 particularly deteriorate with ease due to the network delay or the packet loss.

Accordingly, in the information processing system 10-1, the parity packets are assigned to the stereo images on the transmission side and the restoration based on the parity packets is performed on the reception side. Further, the transmission device 30 increases the redundancy of the parity packets, the larger the parallax of the criterion block and the motion thereof are. This is due to the following reasons.

That is, in the stereo image, a block with large parallax is easily perceived as an image with a large stereoscopic sense (a stereoscopic sense in which a block is shown to protrude, that is, a stereoscopic video effect) by the user. That is, in the block with large parallax, the degree of influence on the stereoscopic video effect is large. According to PTL 1 described above, a parity packet with large redundancy is assigned to a block (packet) with large parallax.

On the other hand, as the dissertations of "QoE Evaluation in Stereoscopic Video Communication" and "Study on Image Quality Evaluation Method for Stereoscopic Video Delivery and System Configuration Technology" show, a block with a large motion is also perceived with ease as an image with a large stereoscopic sense by a user. However, PTL 1 does not consider a motion of a block. Therefore, in the technology disclosed in PTL 1, a parity packet with low redundancy may not avoid being assigned to packets constituting a block with a large motion. Accordingly, when the packets are lost, the restoration based on the parity packets may not be performed in some cases. In this case, video quality considerably deteriorates. Thus, in the first embodiment, a parity packet with large redundancy is assigned to a block with a large motion. Thus, in the first embodiment, it is possible to further improve video quality.

Further, PTL 1 does not consider camera characteristics. On the other hand, as described above, the cameras 20L and 20R capture images with a large motion or images with large parallax according to the characteristics. Therefore, in PTL 1, the redundancy of a parity packet may not be set appropriately in some cases. In the first embodiment, however, since the redundancy of the parity packet is determined according to the camera characteristics, it is possible to further improve video quality.

In PTL 1, when the restoration based on the parity packet is not performed, the error concealment is performed based on the stereo images of a previous frame. However, since the correlation with the stereo image of the previous frame is low in a portion with a large motion in many cases, the error concealment based on the stereo image of the previous frame may not be performed in some cases. Accordingly, the information processing system 10-1 performs error concealment on the criterion block based on the parallax reference block and the motion reference block. That is, the information processing system 10-1 performs the error concealment not only based on the stereo image of the previous frame but also based on the stereo image of the current frame.

Thus, the information processing system 10-1 according to the first embodiment determines the redundancy of the parity packet not only based on the parallax information but also based on the motion information and the camera characteristics. Accordingly, the information processing system 10-1 can improve the video quality. The information processing system 10-1 performs the error concealment not only based on the stereo image of the previous frame but also based on the stereo image of the current frame. Accordingly, the information processing system 10-1 can more reliably restore the stereo image. Hereinafter, the configuration of the information processing system 10-1 will be described in detail.

(1-2. Configurations of Camera and Transmission Device)

Next, the configurations of the cameras 20L and 20R and the transmission device 30 according to this embodiment will be described with reference to FIG. 1. The camera 20L captures a left-eye image and transmits the left-eye image to the transmission device 30. The camera 20R captures a right-eye image and transmits the right-eye image to the transmission device 30.

Thus, in this embodiment, stereoscopic images are perceived by the user based on videos captured by the two cameras 20L and 20R. However, stereoscopic video capturing can be performed with only one camera. Even a one-lens camera is applied appropriately to this embodiment, as long as right and left videos can be formed and a 3D effect can be obtained.

The cameras 20L and 20R can capture images with a large motion or images with large parallax according to the characteristics (for example, installation environments, usages, or the like). For example, when the cameras 20L and 20R are installed behind backboards on a basketball court, the cameras 20L and 20R capture images with depth such as images of a ball or a dunk, that is, images with large parallax.

On the other hand, when the cameras 20L and 20R are installed on the sides of the basketball court, the cameras 20L and 20R capture images in which players or the like are moving intensely, that is, images with a large motion. This is because the cameras 20L and 20R image shapes on the front of the goals and the players are fiercely moving to the front of the goals. That is, objects (for example, players) in the images are moving intensely in the xy directions.

When the cameras 20L and 20R are installed in the middle of the basketball court (a ceiling portion facing the basketball court), the cameras 20L and 20R capture images in which a motion in the x direction is intense. In this case, the cameras 20L and 20R capture shapes at the time of a swift attack or at the start time of the game. However, this is because players or the like are largely moving in specific directions (directions toward the opponents' baskets) at the time of a swift attack or at the start time.

The transmission device 30 includes a 3D processing unit 31, a video encoding unit 32, a packet processing unit 33, an FEC encoding unit 35, and a transmission unit 36. The transmission device 30 has a hardware configuration of a CPU, a ROM, a RAM, a communication device, and the like. The ROM stores a program that causes the transmission device 30 to realize the 3D processing unit 31, the video encoding unit 32, the packet processing unit 33, the FEC encoding unit (encoding unit) 35, and the transmission unit 36. The CPU reads and executes the program stored in the ROM. Accordingly, the 3D processing unit 31, the video encoding unit 32, the packet processing unit 33, the FEC encoding unit (encoding unit) 35, and the transmission unit 36 are realized by the hardware configuration.

The 3D processing unit 31 performs various 3D processes (for example, calibration) necessary to display a stereo image. Thus, when the stereo image is perceived by the user, a stereoscopic video effect can be achieved. The 3D processing unit 31 outputs the stereo image subjected to the 3D processes to the video encoding unit 32.

The video encoding unit 32 divides the stereo image into a plurality of blocks and compresses data of each block. Here, any shape and size of the block can be set according to allowable delay, or image quality or the like necessary for the information processing system 10-1. The video encoding unit 32 outputs the compressed right-eye and left-eye images to the packet processing unit 33. The packet processing unit 33 generates an RTP packet (original packet) for each block of the right-eye and left-eye images by performing a packetizing (RTP packetizing) process for communication. The RTP packet includes an identifier indicating which blocks are configured in the right-eye and left-eye images.

The packet processing unit 33 outputs the packetized right-eye and left-eye images to the FEC encoding unit 35. The FEC encoding unit 35 performs an FEC encoding process. Briefly, the FEC encoding unit 35 extracts a criterion block from one image of the right-eye and left-eye images and extracts a parallax reference block (parallax reference packet) from the other image. Then, the FEC encoding unit 35 generates a parallax vector indicating a distance between a display position of the parallax reference block and a display position of the criterion block. Further, the FEC encoding unit 35 extracts a motion reference block (motion reference packet) corresponding to the criterion block from one frame of a previous frame and generates a motion vector indicating a distance between a display position of the motion reference block and a display position of the criterion block. Then, the FEC encoding unit 35 determines redundancy of a parity packet based on these vectors and a redundancy determination variable table illustrated in FIG. 2. The FEC encoding unit 35 generates a parity packet for each criterion block based on the redundancy. The parity packet includes a parity, right and left frame correlation information, and previous frame correlation information. Each piece of correlation information will be described below.

Here, the FEC encoding process will be described in detail. The FEC encoding process is performed in the following three steps:

step 1 of generating the redundancy determination variable table;

step 2 of calculating a motion vector and a parallax vector by pattern matching; and step 3 of determining the number of parity packets to be assigned and assigning the parity packets.

(Generation of Redundancy Determination Variable Table)

First, the FEC encoding unit 35 generates the redundancy determination variable table illustrated in FIG. 2. The redundancy determination variable table shows a motion vector component weighting constant a, a parallax vector component weighting constant b, a motion parallax vector weighting constant a1, and a packet redundancy normalizing constant X. The motion vector component weighting constant (component weighting information) a indicates a weighting of each component of the motion vector. The parallax vector component weighting constant (component weighting information) b indicates a weighting of each component of the parallax vector.

The weight constants a and b are set based on the characteristics of the cameras 20R and 20L, that is, the camera characteristics. Here, the camera characteristics are information indicating the installation environments, usages, or the like of the cameras 20R and 20L. As described above, the cameras 20R and 20L capture images with a large motion vector and images with a large parallax vector according to the characteristics. Further, the components of the motion vector and the parallax vector are different according to the camera characteristics.

Accordingly, in this embodiment, the weighting constants a and b are set based on the characteristics of the cameras 20R and 20L, that is, the camera characteristics. For example, when the cameras 20R and 20L are installed on the sides of a basketball court, the weighting constant a is considered to be about 0.5. This is because an object in the stereo image is moving intensely in the xy directions. In a block in which the y component of the motion vector is larger, the degree of influence on the stereoscopic video effect is large. Thus, in this case, the weighting on the y component of the motion vector may be set to be large. For example, the weighting constant a may be set to be about 0.3. Thus, since the redundancy of the block with a large motion of the y component increases, the stereoscopic video effect of the stereo image can be improved (see Math. (2) to be described below). When the cameras 20R and 20L are installed in the middle of a basketball court, the weighting constant a considerably increases. In this case, the weighting to the y component of the motion vector considerably decreases. Thus, the redundancy of the block with a large motion of the x component increases.

In principle, the y component of the parallax vector is 0. When the parallax vector is deviated in the y direction due to deviation of the installation positions of the cameras, the deviation of the parallax vector causes 3D sickness or the like. Further, when the y component is extracted, there is a probability that the block matching may fail. Accordingly, in this embodiment, b=1 may be set. In this case, the y component of the parallax vector is cancelled.

The motion parallax vector weighting constant (motion weighting information and parallax weighting information) a1 indicates a weighting of the motion vector and the parallax vector. That is, in this embodiment, the weighting is performed on both the motion vector and the parallax vector. The weighting constant a1 is also set based on the camera characteristics. That is, as described above, a case in which the cameras 20R and 20L capture stereo images (images in which an object is widely moving to the right or left) with a large motion is assumed, or a case in which the cameras 20R and 20L capture stereo images (images in which an object is widely moving to the front or rear) with large parallax is assumed.

Accordingly, in this embodiment, when the cameras 20R and 20L capture stereo images with a large motion, the value of the weighting constant a1 is set to be small. In this case, large weighting is set to the motion vector. Thus, packet loss of a block with a large motion is easily restored. On the other hand, when the cameras 20R and 20L capture stereo images with large parallax, the value of the weighting constant a1 is set to be large. In this case, large weighting is set to the parallax vector. Thus, since the stereoscopic video effect is maintained more reliably, the quality of the image is improved. The packet redundancy normalizing constant X is a constant used to normalize the redundancy to a value in the range of 0 to 1.

The FEC encoding unit 35 can flexibly determine the redundancy by generating the redundancy determination variable table. The FEC encoding unit 35 can generate the redundancy determination variable table when the information processing system 10-1 starts a process or any adjustment is performed. The FEC encoding unit 35 may determine each constant by a user's setting operation. That is, each constant may be determined in any way. However, when the characteristics (a magnitude relation with another vector and the size of each component) of each vector are determined in advance, each constant may be determined according to the camera characteristics or the like.

(Calculation of Motion Vector and Parallax Vector by Pattern Matching)

The FEC encoding unit 35 extracts a first criterion block from one image of the right-eye and left-eye images and calculates a motion vector and a parallax vector of the first criterion block. Here, when the weighting constant a1 is set to 0, the calculation of the parallax vector can be omitted.

Hereinafter, a calculation example of the parallax vector and the motion vector will be described with reference to FIG. 3. FIG. 3 is a diagram illustrating a first criterion block B, a parallax reference block $B_d$, a motion reference block $B_m$, a parallax vector d, and a motion vector m. In FIG. 3, it is assumed that a frame $F_{r,t}$ is a right-eye image of the current frame, a frame $F_{r,t-1}$ is a right-eye image of a previous frame, a frame $F_{l,t}$ is a left-eye image of the current frame, and a frame $F_{l,t-1}$ is a left-eye image of the previous frame. Accordingly, in this example, the right-eye image is set as the one image.

The FEC encoding unit 35 extracts the first criterion block B from the frame $F_{r,t}$. The FEC encoding unit 35 extracts the parallax reference block $B_d$ corresponding to the first criterion block B from the frame $F_{l,t}$ by block matching or the like. The FEC encoding unit 35 extracts the motion reference block $B_m$ corresponding to the criterion block B from the frame $F_{r,t-1}$.

The FEC encoding unit 35 calculates the motion vector m by Math. (1) below. The motion vector m indicates a distance between a display position of the motion reference block $B_m$ and a display position of the first criterion block B, that is, indicates how much the first criterion block B varies temporally.

[Math. 1]

$$f(m) = \sum_{p \in B} |F_{r,t}(p) - F_{r,t-1}(p+m)| \quad (1)$$

Here, it is assumed that p is a pixel and F is a luminance value indicated by the pixel p. The motion vector $m=(m_x, m_y)$ is assumed to minimize f(m) (the sum of luminance value differences). Likewise, the FEC encoding unit 35 also calculates the parallax vector d=(dx, dy) from $F_{l,t}$. The parallax vector d indicates a distance between a display position of the parallax reference block $B_d$ and a display position of the first criterion block B, that is, indicates how much parallax the first criterion block B has.

The FEC encoding unit 35 calculates the parallax vectors and the motion vectors for all of the blocks of the one image. Then, the FEC encoding unit 35 extracts a second criterion block from the other image and performs the same process as the above-described process.

Thus, the FEC encoding unit 35 calculates the parallax vectors and the motion vectors for all of the blocks of the right-eye and left-eye images. The FEC encoding unit 35 may use the parallax vector and the motion vector of the first criterion block as the parallax vector and the motion vector of the second criterion block by associating the second criterion block with the first criterion block based on the result of the block matching described above. The parallax vector of the second criterion block has an inverse sign of the first parallax vector. Thus, a task of the calculation of the vector can be reduced. Hereinafter, the first and second criterion blocks are also collectively referred to as "criterion blocks."

(Determination of Number of Parity Packets to be Assigned and Assignment of Parity Packets)

Next, the FEC encoding unit 35 determines the number of parity packets and assigns the parity packets. Specifically, the redundancy of each criterion block is first calculated based on the redundancy determination variable table, the parallax vector, the motion vector, and Math. (2) below. In Math. (2), P indicates the redundancy.

[Math. 2]

$$P = \frac{(1-a1)(a*mx^2 + (1-a)*my^2) + a1(b*dx^2 + (1-b)*dy^2)}{X} \quad (2)$$

The FEC encoding unit 35 generates the parity packets (error correction code (ECC) information) based on the redundancy and an amount of information (specifically, the number of original packets) of the criterion block. Specifically, the FEC encoding unit 35 determines the number of parity packets by multiplying the number of original packets by the redundancy. A value after the decimal point is considered to be rounded down, but may be rounded off or rounded up. Then, the FEC encoding unit 35 generates the parity packets by the number of parity packets and assigns the parity packets to the original packets of the criterion block. Thus, the redundancy is defined as a ratio of the parity packets to be assigned to an original packet group constituting the criterion block. Further, an amount of information per original packet and an amount of information per parity packet are assumed to be set in advance.

Here, the FEC encoding unit 35 causes the parity packet to include the right and left frame correlation information and the previous frame correlation information. The right and left frame correlation information includes information indicating the position of the parallax reference block corresponding to the criterion block and information (for example, the parallax vector d or a luminance value difference f(d)) indicating correlation between the criterion block and the parallax reference block. The previous frame correlation information includes information indicating the position of the parallax reference block corresponding to the criterion block and information (for example, a motion vector m or the luminance value difference f(m)) indicating correlation between the criterion block and the motion reference block.

An example is illustrated in FIG. 4. In FIG. 4, criterion blocks A, B, and C are extracted from the frame $F_{r,t}$. In this example, when three original packets constituting the criterion block A are present and the redundancy P is 0.5, one parity packet is assigned. Likewise, when four original packets constituting the criterion block B are present and the redundancy P is 0.5, two parity packets are assigned. On the other hand, when the redundancy of the criterion block C is high (an influence on the stereoscopic video effect is high), P is set to 1.0 and three parity packets are assigned.

Here, the FEC encoding unit 35 can monitor a network status and determine the redundancy (limit the number of parity packets) based on a monitoring result. For example, the FEC encoding unit 35 sets the maximum bit rate when delay or jitter starts increasing and the network status becomes worse. When the current bit rate exceeds the maximum bit rate, the FEC encoding unit 35 performs control of traffic by lowering the redundancy (reducing the number of parity packets) so that the current bit rate is equal to or less than the maximum bit rate.

As another example of the control of traffic, a method of reducing the number of criterion blocks (that is, reducing the number of criterion blocks in which the parity packets are assigned) to be matched can be exemplified. Further, a method of reducing the throughput of the calculation of the redundancy (for example, a method of setting the redundancy to a constant when the value of the motion vector or the parallax vector is less than a predetermined value) or a method of omitting the calculation of the parallax vector or the motion vector can be exemplified. When the calculation of the parallax vector or the motion vector is omitted, for example, the component of the omitted vector is considered to be 0.

The FEC encoding unit 35 outputs the stereo image using the parity packets and the original packets as stereo image packets (UDP/IP packets) to the transmission unit 36. The transmission unit 36 transmits the stereo image packets of the left-eye image and the stereo image packets of the right-eye image to the reception device 50.

(1-3. Configuration of Reception Device)

Next, the configuration of the reception device 50 will be described with reference to FIG. 1. The reception device 50 includes a reception unit 51, an FEC decoding unit (decoding unit) 52, a packet processing unit 53, and a video decoding unit 54. The reception device 50 has a hardware configuration of a CPU, a ROM, a RAM, a communication device, and the like. The ROM stores a program that causes the reception device 50 to realize the reception unit 51, the FEC decoding unit (decoding unit) 52, the packet processing unit 53, and the video decoding unit 54. The CPU reads and executes the program stored in the ROM. Accordingly, the reception unit 51, the FEC decoding unit (decoding unit) 52, the packet processing unit 53, and the video decoding unit 54 are realized by the hardware configuration.

The reception unit 51 receives the stereo image packets and outputs the stereo image packets to the FEC decoding unit 52. When the reception unit 51 detects lost packets from original packets, the reception unit 51 notifies the FEC decoding unit 52 that the packets are lost.

When the FEC decoding unit 52 detects the lost packets, the FEC decoding unit 52 first attempts to restore the stereo image packets based on the parity packets. When the packets are lost beyond the allowable scope of restoration based on the parity packets, that is, restoration based on the parity packets is difficult, the FEC decoding unit 52 performs error concealment. Specifically, the FEC decoding unit 52 determines which correlation is higher between the parallax reference block and the motion reference block based on the previous frame correlation information and the right and left frame correlation information. The determination criterion is, for example, a sum f of luminance value differences. For example, when f(d)<f(m), the parallax reference block has higher correlation with the criterion block than the motion reference block. Then, the FEC decoding unit 52 restores the original packets using the block with the higher correlation. For example, the FEC decoding unit 52 assumes the original packets of the block with the higher correlation as the original packets of the criterion block. Thereafter, the FEC decoding unit 52 outputs the stereo image packets to the packet processing unit 53.

The packet processing unit 53 restores the stereo image packets to stream information (compressed stereo image). The video decoding unit 54 restores the stream information to the original stereo images, that is, the stereo images captured by the cameras 20L and 20R. The video decoding unit 54 causes the display device 60 to display the stereo images. The display device 60 can display the stereo images stereoscopically. That is, the display device 60 enables the right and left eyes of the user to perceive the right-eye image and the left-eye image, respectively.

<1-4. Processing Order by Transmission Device>

Next, a processing order by the transmission device 30 will be described with reference to the flowchart of FIG. 5. In step S10, the 3D processing unit 31 determines whether stereo images (video images) are input from the cameras 20R and 20L. When the 3D processing unit 31 determines that the stereo images are input from the cameras 20R and 20L, the process proceeds to step S20. When the 3D processing unit 31 determines that the stereo images are not input from the cameras 20R and 20L, the process ends.

In step S20, the 3D processing unit 31 performs various 3D processes necessary to display the stereo images. The 3D processing unit 31 outputs the right-eye and left-eye images subjected to the 3D processes to the video encoding unit 32.

In step S30, the video encoding unit 32 performs a video encoding process. Specifically, the video encoding unit 32 divides the stereo images into a plurality of blocks and compresses data for each block. The video encoding unit 32 outputs the compressed stereo images to the packet processing unit 33.

In step S40, the packet processing unit 33 performs the packetizing (RTP packetizing) process for communication to generate an RTP packet (original packet) for each block of the stereo images. The packet processing unit 33 outputs the packetized right-eye and left-eye images to the FEC encoding unit 35.

In step S50, the FEC encoding unit 35 performs the FEC encoding process. Specifically, the FEC encoding unit 35 performs the above-described three steps (the generation of the redundancy determination variable table, the calculation of the motion vector and the parallax vector by the pattern matching, the determination of the number of parity packets to be assigned, and the FEC encoding process). The FEC encoding unit 35 outputs the stereo images using the parity packets and the original packets as the stereo image packets (UDP/IP packets) to the transmission unit 36. In step S60, the transmission unit 36 transmits the stereo image packets to the reception device 50. Thereafter, the transmission device 30 ends the process.

<1-5. Processing Order by Reception Device>

Next, a processing order by the reception device 50 will be described with reference to the flowchart of FIG. 6. In step S110, the reception unit 51 determines whether the stereo image packets are received. When the reception unit 51 determines that the stereo image packets are received, the process proceeds to step S120. When the reception unit 51 determines that the stereo image packets are not received, the process ends.

In step S120, when the reception unit 51 detects lost packets from the original packets, the reception unit 51 notifies the FEC decoding unit 52 that the packets are lost. When the lost packets are detected, the FEC decoding unit 52 attempts to restore the stereo image packets based on the parity packets. When the lost packets are not present, the FEC decoding unit 52 outputs the stereo image packets to the packet processing unit 53. Thereafter, the packet processing unit 53 performs the process of step S180.

In step S130, the FEC decoding unit 52 determines whether the restoration based on the parity packets is performed. When the FEC decoding unit 52 determines that the restoration based on the parity packets is performed, the FEC decoding unit 52 outputs the restored stereo image packets to the packet processing unit 53 and the process proceeds to step S180. Conversely, when the FEC decoding unit 52 determines that the restoration based on the parity packets is not performed, the process proceeds to step S140.

In step S140, the FEC decoding unit 52 starts the error concealment process. Specifically, in step S150, the FEC decoding unit 52 determines which correlation is higher between the parallax reference block and the motion reference block based on the previous frame correlation information and the right and left frame correlation information. When the FEC decoding unit 52 determines that the correlation of the parallax reference block is higher than the correlation of the motion reference block, the process proceeds to step S160. Conversely, when the FEC decoding unit 52 determines that the correlation of the motion reference block is higher than the correlation of the parallax reference block, the process proceeds to step S170. Further, when both the correlations are equal to each other, the FEC decoding unit 52 may perform the process of any one of step S160 and S170.

In step S160, the FEC decoding unit 52 restores the original packet of the criterion block using the parallax reference block. For example, the FEC decoding unit 52 sets the original packet of the parallax reference block to the original packet of the criterion block. Thereafter, the FEC decoding unit 52 outputs the stereo image packets to the packet processing unit 53 and the process proceeds to step S180.

In step S170, the FEC decoding unit 52 restores the original packet of the criterion block using the motion reference block. For example, the FEC decoding unit 52 sets the original packet of the motion reference block to the original packet of the criterion block. Thereafter, the FEC decoding unit 52 outputs the stereo image packets to the packet processing unit 53 and the process proceeds to step S180.

In step S180, the packet processing unit 53 restores the stereo image packets to the stream information (compressed stereo images). In step S170, the video decoding unit 54 restores the stream information to the original stereo images, that is, the stereo images captured by the cameras 20R and 20L. The video decoding unit 54 causes the display device 60 to display the stereo images. Thereafter, the reception device 50 ends the process.

In the first embodiment, as described above, the information processing system 10-1 can construct the stereoscopic video live transmission system tolerant of the packet loss. Since the information processing system 10-1 can determine each weighting constant according to the intensity of the stereoscopic video effect and the degree of influence on the video quality, the information processing system 10-1 can suppress the loss of the stereoscopic video effect caused in the network transmission. Even when the packet loss may not be restored based on the parity packets, the information processing system 10-1 can provide videos without damage to the stereoscopic video effect through an interpolation process (error concealment process).

That is, the information processing system 10-1 generates the parity packet (error correction code (ECC) information) assigned to the criterion block based on the parallax information and the motion information. Here, when the motion of the criterion block is large (an amount of movement from a previous frame is large), the criterion block may have a large influence on the stereoscopic video effect. However, the information processing system 10-1 can assign the parity packet according to the motion of the criterion block. Accordingly, since the information processing system 10-1 can assign the abundant parity packets to the criterion block with a large motion, it is possible to suppress quality deterioration caused in the network transmission of the stereo images.

The information processing system 10-1 determines the redundancy of the parity packets based on the parallax information and the motion information and generates the parity packets based on the number of original packets (an amount of information of the criterion block) and the redundancy. Thus, the information processing system 10-1 can assign the parity packets more reliably according to the motion of the criterion block.

Since the information processing system 10-1 determines the redundancy based on the camera characteristics, the information processing system 10-1 can calculate the redundancy more accurately.

Since the information processing system 10-1 determines the redundancy based on the installation environments of the cameras 20R and 20L, the information processing system 10-1 can calculate the redundancy more accurately.

The information processing system 10-1 determines the redundancy based on the motion parallax vector weighting constant a1 (the parallax weighting information and the motion weighting information). Accordingly, the information processing system 10-1 can calculate the redundancy more accurately.

The information processing system 10-1 determines the redundancy based on the motion vector weighting constant a and the parallax vector weighting constant b (component weighting information). Accordingly, the information processing system 10-1 can calculate the redundancy more accurately.

Since the information processing system 10-1 determines the redundancy based on a network status, it is possible to prevent an excessive load from being applied to traffic.

Since the parallax information and the motion information for the first criterion block are used as the parallax information and the motion information for the second criterion block, the task of the calculation of the redundancy can be reduced.

When the restoration of the criterion block based on the parity packets is not achieved, the information processing system 10-1 performs the error concealment process on the criterion block based on the parallax reference block and the motion reference block. Accordingly, the information processing system 10-1 can restore the criterion block more reliably.

The information processing system 10-1 performs the error concealment on the criterion block based on the block with the higher correlation to the criterion block between the parallax reference block and the motion reference block. Accordingly, the information processing system 10-1 can restore the criterion block more reliably and accurately.

<2. Second Embodiment>

Next, a second embodiment will be described. FIG. 7 is a diagram illustrating the configuration of an information processing system 10-2 according to the second embodiment. The information processing system 10-2 is different from the information processing system 10-1 in that n (where n is an integer equal to or greater than 3) cameras 20-1 to 20-n are connected to a transmission device 30 via a switcher 70 and a network (IP network) 25.

The cameras 20-1 to 20-n generate captured images by performing imaging. A camera ID used to uniquely specify the camera generating a captured image is assigned to the captured image. The cameras 20-1 to 20-n transmit the captured images to the switcher 70. The cameras 20-1 to 20-n form pairs of cameras. Of the cameras forming a pair of cameras, one camera captures a right-eye image and the other camera captures a left-eye image. One camera can be included in a plurality of pairs of cameras in some cases. In this case, a given camera may capture a right-eye image in one pair of cameras and capture a left-eye image in another pair of cameras in some cases.

The switcher 70 stores a 3D target camera video ID pair (Rid, Lid). The 3D target camera video ID pair is constituted by a right-eye camera ID (Rid) and a left-eye camera ID (Lid). The right-eye camera ID indicates the camera ID of a camera capturing a right-eye image and the left-eye camera ID indicates the camera ID of a camera capturing a left-eye image.

The switcher 70 classifies the captured images into the right-eye image and the left-eye image based on the 3D target camera video ID pair and the camera ID assigned to each captured image. The switcher 70 assigns a flag indicating a right-eye image to the right-eye image and assigns a flag indicating a left-eye image to the left-eye image. The switcher 70 generates the stereo images formed from the right-eye and left-eye images and outputs the stereo images to the transmission device 30.

The transmission device 30 has the same configuration as that of the first embodiment and performs the same process as that of the first embodiment. However, the structure of a redundancy determination variable table 34 is different from that of the first embodiment. FIG. 8 is a diagram illustrating an example of the redundancy determination variable table 34 according to the second embodiment. As illustrated in FIG. 8, in the redundancy determination variable table 34 according to the second embodiment, an item of "3D target camera video ID pair" is added to the redundancy determination variable table 34 according to the first embodiment. That is, the information processing system 10-2 includes the redundancy determination variable table 34 for each 3D target camera video ID pair. This is because the camera characteristics are different for each 3D target camera video ID pair in some cases. Of course, when the camera characteristics are common in the plurality of 3D target camera video ID pairs, the redundancy determination variable table 34 may be commonly used in the 3D target camera video ID pairs. The FEC encoding unit 35 selects the redundancy determination variable table 34 based on the camera ID pair assigned to the stereo image and performs the same process as that of the first embodiment based on the selected redundancy determination variable table 34.

Even in the second embodiment, the same advantages as those of the first embodiment can be obtained. In the second embodiment, the information processing system 10-2 can set a different redundancy for the characteristics of each pair of cameras.

The switcher 70 may perform some of the processes of the transmission device 30, particularly, the processes of the 3D processing unit 31, the video encoding unit 32, and the packet processing unit 33. The switcher 70 may be included in the transmission device 30.

<Embodiment>

Next, an embodiment will be described with reference to FIG. 9. In the embodiment, as illustrated in FIG. 9, live 3D video delivery of a basketball using a plurality of cameras A to G will be described. In the example, seven cameras A to G are installed and are each connected to an IP network. That is, in this embodiment, the information processing system 10-2 according to the second embodiment is used.

In the embodiment, a pair of cameras A and B, a pair of cameras C and D, a pair of cameras E and F, and a pair of cameras F and G are configured. The camera F captures a right-eye image in the pair of cameras E and F and captures a left-eye image in the pair of cameras F and G.

The pair of cameras A and B are installed behind a backboard, and thus have camera characteristics in which images with depth such as images of a ball or a dunk are captured. Thus, the FEC encoding unit 35 preferentially assigns the parity packets to packets constituting a criterion block with a large parallax vector by increasing the weighting constant a1.

On the other hand, the pair of cameras C and D are installed on a side of a basketball court, and thus have camera characteristics in which images of the entire court are captured. An amount of exercise of players captured by the pair of cameras C and D is the largest (that is, objects (players) in the captured images are moving intensely in the xy directions). Therefore, the FEC encoding unit 35 preferentially assigns the parity packets to packets constituting a criterion block with a large exercise amount vector by decreasing the weighting constant a1. The FEC encoding unit 35 may increase the weighting to the y component of the motion vector by decreasing the weighting constant a.

On the other hand, the pair of cameras E and F and the pair of cameras F and G are installed in the middle of the basketball court (a ceiling portion facing the middle of the basketball court), and thus have camera characteristics in which images of shapes at the beginning of the game, during a fast play, or the like are captured. That is, there is a probability that the pair of cameras E and F and the pair of cameras F and G capture images with a large motion and images with depth. Therefore, the FEC encoding unit 35 sets the weighting constant a1 to 0. The FEC encoding unit 35 increases the redundancy of a criterion block in which a lateral movement is intense by decreasing the weighting of the y component of the motion vector (that is, increasing the weighting constant a). Thus, when the camera characteristics (that is, the positions, situations, or the like of the cameras) are determined in advance, the information processing system 10-2 can perform the weighting appropriately so that the image deterioration caused due to packet loss in the network can be prevented.

The preferred embodiments of the present disclosure have been described in detail with reference to the appended drawings, but the present disclosure is not limited thereto. It should be apparent to those skilled in the art that various modifications or corrections can be made within the scope of the technical spirit and essence described in the claims and are, of course, construed to pertain to the technical scope of the present disclosure.

The present technology may also assume the following configurations.

(1) A system, comprising:
at least one processor configured to perform:
accessing parallax information for a first portion of a first image, the parallax information calculated based on a second image associated with the first image;
accessing motion information for the first portion of the first image, the motion information calculated based on a third image captured at a different time than the first image; and
generating error correction information for the first portion of the first image based on the parallax information and the motion information.

(2) The system of (1), wherein the at least one processor is further configured to encode the first portion based on the generated error correction information to obtain a first encoded portion.

(3) The system of (2), wherein the at least one processor is further configured to transmit the first encoded portion and the generated error correction information to another system.

(4) The system of (1), wherein the at least one processor is further configured to calculate the parallax information for the first portion of the first image.

(5) The system of (1), wherein the at least one processor is further configured to calculate the motion information for the first portion of the first image.

(6) The system of (1), wherein generating the error correction information for the first portion comprises:
generating error correction information having a large redundancy when the parallax information indicates that the first portion has large parallax.

(7) The system of (1), wherein generating the error correction information for the first portion comprises:
generating error correction information having a large redundancy when the motion information is indicative of a large amount of motion.

(8) The system of (1), wherein the first image is obtained by a first camera, and wherein the at least one processor is configured to perform generating error correction information based on information associated with the first camera.

(9) The system of (8), wherein information associated with the first camera comprises information about an environment in which the first camera obtained the first image.

(10) The system of (1), wherein the first image is obtained at a first view point, and wherein generating the error correction information for the first portion comprises weighting the parallax information and the motion information based on information associated with the first view point.

(11) The system of (1), further comprising a 3D processing unit configured to calculate a stereo image based on the first image and the second image.

(12) The system of (1), wherein the error correction information comprises error correction code (ECC) information.

(13) The system of (1), wherein the first image is obtained at a first view point and wherein the second image is obtained at a second view point different from the first view point.

(14) The system of (13), wherein the third image is obtained at the first view point.

(15) The system of (4), wherein the parallax information is calculated based on a distance between a display position of the first portion and a display position of a second portion of the second image corresponding to the first portion.

(16) The system of (5), wherein the motion information is calculated based on a distance between a display position of the first portion and a display position of a third portion of the third image corresponding to the first portion.

(17) A system, comprising:
a first system, comprising at least one processor configured to perform:
accessing parallax information for a first portion of a first image, the parallax information calculated based on a second image associated with the first image; accessing motion information for the first portion of the first image, the motion information calculated based on a third image captured at a different time than the first image; and
generating error correction information for the first portion of the first image based on the parallax information and the motion information;
encoding the first portion of the first image based at least in part on the error correction information to obtain a first encoded portion; and
transmitting the first encoded portion and the error correction information to a second system; and
the second system, configured to perform acts of:
receiving the first encoded portion and the generated error correction information from the first system; and
decoding the first encoded portion to obtain a first decoded portion.

(18) The system of (17), wherein the second system is further configured to perform error concealment on the first decoded portion based on the error correction information.

(19) A method, comprising:
accessing parallax information for a first portion of a first image, the parallax information calculated based on a second image associated with the first image;
accessing motion information for the first portion of the first image, the motion information calculated based on a third image captured at a different time than the first image; and
generating error correction information for the first portion of the first image based on the parallax information and the motion information.

(20) A memory storing a program that, when executed by at least one processor, causes the at least one processor to perform:
accessing parallax information for a first portion of a first image, the parallax information calculated based on a second image associated with the first image;
accessing motion information for the first portion of the first image, the motion information calculated based on a third image captured at a different time than the first image; and
generating error correction information for the first portion of the first image based on the parallax information and the motion information.

(21) A system, comprising:
at least one processor configured to perform:
accessing parallax information for a first portion of a first image, the parallax information calculated based on a second image associated with the first image; accessing motion information for the first portion of the first image, the motion information calculated based on a third image captured at different time than the first image; and
executing error concealment processing for the first portion of the first image based on the parallax information and the motion information.

(22) The system of (21), wherein the at least one processor is further configured to: access error correction information for the first portion of the first image, the error correction information generated by another system based on the parallax information and the motion information, and
execute error concealment processing when restoration processing of the first portion of the first image based on the error correction information is not performed.

(23) A method, comprising:
accessing parallax information for a first portion of a first image, the parallax information calculated based on a second image associated with the first image;
accessing motion information for the first portion of the first image, the motion information calculated based on a third image captured at a different time from the first image; and
executing error concealment processing for the first portion of the first
image based on the parallax information and the motion information.

(24) A memory storing a program that, when executed by at least one processor, causes the at least one processor to perform:
accessing parallax information for a first portion of a first image, the parallax information calculated based on a second image associated with the first image;

accessing motion information for the first portion of the first image, the motion information calculated based on a third image captured at a different time from the first image; and executing error concealment processing for the first portion of the first image based on the parallax information and the motion information.

(25) An information processing device including:

an encoding unit that extracts a criterion block from one image of right-eye and left-eye images, extracts a parallax reference block corresponding to the criterion block from the other image, and generates parallax information indicating a distance between a display position of the parallax reference block and a display position of the criterion block, extracts a motion reference block corresponding to the criterion block from the one image of a previous frame and generates motion information indicating a distance between a display position of the motion reference block and the display position of the criterion block, and generates error correction code (ECC) information to be assigned to the criterion block based on the parallax information and the motion information.

(26) The information processing device according to (25), wherein the encoding unit determines redundancy of the error correction code (ECC) information based on the parallax information and the motion information and generates the error correction code (ECC) information based on an amount of information of the criterion block and the redundancy.

(27) The information processing device according to (26), wherein the right-eye and left-eye images are images captured by an imaging device, and wherein the encoding unit determines the redundancy based on characteristics of the imaging device.

(28) The information processing device according to (27), wherein the encoding unit determines the redundancy based on an installation environment of the imaging device.

(29) The information processing device according to any one of (26) to (28), wherein the encoding unit determines the redundancy based on parallax weighting information used to weight the parallax information and motion weighting information used to weight the motion information.

(30) The information processing device according to any one of (26) to (29), wherein the encoding unit determines the redundancy based on component weighting information used to weight components of the parallax information and the motion information.

(31) The information processing device according to any one of (26) to (30), wherein the encoding unit determines the redundancy based on a network status.

(32) The information processing device according to any one of (25) to (31), wherein the encoding unit extracts a first criterion block from one image of the right-eye and left-eye images, extracts a parallax reference block corresponding to the first criterion block from the other image, and generates parallax information indicating a distance between the display position of the parallax reference block and a display position of the first criterion block, extracts a motion reference block corresponding to the first criterion block from the one image of a previous frame and generates motion information indicating a distance between a display position of the motion reference block and the display position of the first criterion block, generates error correction code (ECC) information to be assigned to the first criterion block based on the parallax information and the motion information, and extracts a second criterion block from the other image and generates error correction code (ECC) information to be assigned to the second criterion block by using the parallax information and the motion information for the first criterion block as parallax information and motion information for the second criterion block.

(33) An information processing device including:

a reception unit that receives error correction code (ECC) information from another information processing device that extracts a criterion block from one image of right-eye and left-eye images, extracts a parallax reference block corresponding to the criterion block from the other image, generates parallax information indicating a distance between a display position of the parallax reference block and a display position of the criterion block, extracts a motion reference block corresponding to the criterion block from the one image of a previous frame, generates motion information indicating a distance between a display position of the motion reference block and the display position of the criterion block, and generates the error correction code (ECC) information to be assigned to the criterion block based on the parallax information and the motion information; and a decoding unit that performs an error concealment process on the criterion block based on the parallax reference block and the motion reference block, when restoration of the criterion block based on the error correction code (ECC) information is not performed.

(34) The information processing device according to (33), wherein the decoding unit performs the error concealment on the criterion block based on the block with higher correlation to the criterion block between the parallax reference block and the motion reference block.

(35) An information processing method including:

extracting a criterion block from one image of right-eye and left-eye images, extracting a parallax reference block corresponding to the criterion block from the other image, and generating parallax information indicating a distance between a display position of the parallax reference block and a display position of the criterion block, extracting a motion reference block corresponding to the criterion block from the one image of a previous frame and generating motion information indicating a distance between a display position of the motion reference block and the display position of the criterion block, and generating error correction code (ECC) information to be assigned to the criterion block based on the parallax information and the motion information.

(36) An information processing method including:

receiving error correction code (ECC) information from another information processing device that extracts a criterion block from one image of right-eye and left-eye images, extracts a parallax reference block corresponding to the criterion block from the other image, generates parallax information indicating a distance between a display position of the parallax reference block and a display position of the criterion block, extracts a motion reference block corresponding to the criterion block from the one image of a previous frame, generates motion information indicating a distance between a display position of the motion reference block and the display position of the criterion block, and generates the error correction code (ECC) information to be assigned to the criterion block based on the parallax information and the motion information; and performing an error concealment process on the criterion block based on the parallax reference block and the motion reference block when restoration of the criterion block based on the error correction code (ECC) information is not performed.

(37) A program causing a computer to realize an encoding function of:

extracting a criterion block from one image of right-eye and left-eye images, extracting a parallax reference block corresponding to the criterion block from the other image, and generating parallax information indicating a distance between a display position of the parallax reference block and a display position of the criterion block, extracting a motion reference block corresponding to the criterion block from the one image of a previous frame and generating motion information indicating a distance between a display position of the motion reference block and the display position of the criterion block, and generating error correction code (ECC) information to be assigned to the criterion block based on the parallax information and the motion information.

(38) A program causing a computer to realize:

a reception function of receiving error correction code (ECC) information from another information processing device that extracts a criterion block from one image of right-eye and left-eye images, extracts a parallax reference block corresponding to the criterion block from the other image, generates parallax information indicating a distance between a display position of the parallax reference block and a display position of the criterion block, extracts a motion reference block corresponding to the criterion block from the one image of a previous frame, generates motion information indicating a distance between a display position of the motion reference block and the display position of the criterion block, and generates the error correction code (ECC) information to be assigned to the criterion block based on the parallax information and the motion information; and a decoding function of performing an error concealment process on the criterion block based on the parallax reference block and the motion reference block when restoration of the criterion block based on the error correction code (ECC) information is not performed.

Some embodiments may comprise a non-transitory computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage media) encoded with one or more programs (e.g., a plurality of processor-executable instructions) that, when executed on one or more computers or other processors, perform methods that implement the various embodiments discussed above. As is apparent from the foregoing examples, a non-transitory computer-readable storage medium may retain information for a sufficient time to provide computer executable instructions in a non-transitory form.

It should be understood by those skilled in the art that various modifications, combinations, sub-combinations and alterations may occur depending on design requirements and other factors insofar as they are within the scope of the appended claims or the equivalents thereof.

Use of ordinal terms such as "first," "second," "third," etc., in the claims to modify a claim element does not by itself connote any priority, precedence, or order of one claim element over another or the temporal order in which acts of a method are performed. Such ordinal terms are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

REFERENCE SIGNS LIST 20R, 20L Camera
30 Transmission device
31 3D processing unit
32 Video encoding unit
33 Packet processing unit
34 Redundancy determination variable table
35 FEC encoding unit
36 Transmission unit
40 Network
50 Reception device
51 Reception unit
52 FEC decoding unit
53 Packet processing unit
54 Video decoding unit
60 Display device

The invention claimed is:

1. A system, comprising:
at least one hardware processor configured to perform:
  accessing parallax information for a first portion of a first image, the parallax information calculated based on a second image associated with the first image;
  accessing motion information, different from the parallax information, for the first portion of the first image, the motion information calculated based on a third image captured at a different time than the first image;
  generating error correction information for the first portion of the first image based on the parallax information and the motion information; and
  transmitting the error correction information to a second system.

2. The system of claim 1, wherein the at least one processor is further configured to encode the first portion based on the generated error correction information to obtain a first encoded portion.

3. The system of claim 1, wherein the at least one processor is further configured to calculate the parallax information for the first portion of the first image.

4. The system of claim 1, wherein the at least one processor is further configured to calculate the motion information for the first portion of the first image.

5. The system of claim 1, wherein the first image is obtained by a first camera, and wherein the at least one processor is configured to perform generating error correction information based on information associated with the first camera.

6. The system of claim 5, wherein information associated with the first camera comprises information about an installation environment in which the first camera obtained the first image.

7. The system of claim 1, wherein the first image is obtained at a first view point, and wherein generating the error correction information for the first portion comprises weighting the parallax information and the motion information based on information associated with the first view point.

8. The system of claim 1, further comprising a 3D processing unit configured to calculate a stereo image based on the first image and the second image.

9. The system of claim 1, wherein the error correction information comprises error correction code (ECC) information.

10. The system of claim 1, wherein the first image is obtained at a first view point and wherein the second image is obtained at a second view point different from the first view point.

11. The system of claim 10, wherein the third image is obtained at the first view point.

12. The system of claim 3, wherein the parallax information is calculated based on a distance between a display position of the first portion and a display position of a second portion of the second image corresponding to the first portion.

13. The system of claim 4, wherein the motion information is calculated based on a distance between a display position of the first portion and a display position of a third portion of the third image corresponding to the first portion.

14. A system, comprising:
a first system, comprising at least one hardware processor configured to perform:
accessing parallax information for a first portion of a first image, the parallax information calculated based on a second image associated with the first image;
accessing motion information, different from the parallax information, for the first portion of the first image, the motion information calculated based on a third image captured at a different time than the first image; and
generating error correction information for the first portion of the first image based on the parallax information and the motion information;
encoding the first portion of the first image based at least in part on the error correction information to obtain a first encoded portion; and
transmitting the first encoded portion and the error correction information to a second system; and
the second system, configured to perform acts of:
receiving the first encoded portion and the generated error correction information from the first system; and
decoding the first encoded portion to obtain a first decoded portion.

15. The system of claim 14, wherein the second system is further configured to perform error concealment on the first decoded portion based on the error correction information.

16. A method performed by a transmission device, the method comprising:
using the transmission device to perform:
accessing parallax information for a first portion of a first image, the parallax information calculated based on a second image associated with the first image;
accessing motion information, different from the parallax information, for the first portion of the first image, the motion information calculated based on a third image captured at a different time than the first image; and
generating error correction information for the first portion of the first image based on the parallax information and the motion information; and
transmitting the error correction information to a second system.

17. At least one non-transitory computer-readable storage medium storing a program that, when executed by at least one processor, causes the at least one processor to perform:
accessing parallax information for a first portion of a first image, the parallax information calculated based on a second image associated with the first image;
accessing motion information, different from the parallax information, for the first portion of the first image, the motion information calculated based on a third image captured at a different time than the first image;
generating error correction information for the first portion of the first image based on the parallax information and the motion information; and
transmitting the error correction information to another system.

18. A system, comprising:
at least one hardware processor configured to perform:
receiving, from an external system, a first image, a second image associated with the first image, and a third image captured at a different time than the first image;
accessing parallax information for a first portion of the first image, the parallax information calculated based on the second image associated with the first image;
accessing motion information, different from the parallax information, for the first portion of the first image, the motion information calculated based on the third image captured at different time than the first image; and
executing error concealment processing for the first portion of the first image based on the parallax information and the motion information.

19. The system of claim 18, wherein the at least one hardware processor is further configured to:
access error correction information for the first portion of the first image, the error correction information generated by another system based on the parallax information and the motion information; and
execute error concealment processing when restoration processing of the first portion of the first image based on the error correction information is not performed.

20. A method performed by a reception device, the method comprising:
using a reception device to perform:
receiving, from an external system, a first image, a second image associated with the first image, and a third image captured at a different time than the first image
accessing parallax information for a first portion of the first image, the parallax information calculated based on the second image associated with the first image;
accessing motion information, different from the parallax information, for the first portion of the first image, the motion information calculated based on the third image captured at a different time from the first image; and
executing error concealment processing for the first portion of the first image based on the parallax information and the motion information.

21. At least one non-transitory storage medium storing a program that, when executed by at least one processor, causes the at least one processor to perform:
receiving, from an external system, a first image, a second image associated with the first image, and a third image captured at a different time from the first image;

accessing parallax information for a first portion of the first image, the parallax information calculated based on the second image associated with the first image;
accessing motion information, different from the parallax information, for the first portion of the first image, the motion information calculated based on the third image captured at a different time from the first image; and
executing error concealment processing for the first portion of the first image based on the parallax information and the motion information.

* * * * *